United States Patent [19]

Berkowitz et al.

[11] 4,178,405

[45] Dec. 11, 1979

[54] MAGNETIC BELT WITH CONDUCTIVE COATING

[75] Inventors: Ami E. Berkowitz, Schenectady, N.Y.; Joseph A. Lahut, Waynesboro, Va.

[73] Assignee: General Electric Company, Schenectady, N.Y.

[21] Appl. No.: 840,261

[22] Filed: Oct. 7, 1977

[51] Int. Cl.$^{2}$ ........................... B32B 7/02; G11B 5/78

[52] U.S. Cl. .................................... 428/215; 360/134; 427/122; 427/128; 427/131; 427/132; 428/244; 428/332; 428/337; 428/458; 428/900

[58] Field of Search ............... 428/332, 337, 900, 215, 428/458, 244; 427/131, 132, 128, 122; 360/134; 346/74.1

[56] References Cited

U.S. PATENT DOCUMENTS

| | | | |
|---|---|---|---|
| 3,932,688 | 1/1976 | Sugita et al. | 427/132 |
| 3,946,404 | 3/1976 | Berkowitz et al. | 346/74.1 |
| 3,993,824 | 11/1976 | Shirahata et al. | 427/131 X |
| 4,069,367 | 1/1978 | Umeki et al. | 428/900 X |
| 4,087,582 | 5/1978 | Shirahata et al. | 428/900 X |
| 4,092,459 | 5/1978 | Deffeyes et al. | 428/900 X |
| 4,117,190 | 9/1978 | Akashi et al. | 428/900 X |
| 4,132,827 | 1/1979 | Mukaida et al. | 428/900 X |
| 4,135,016 | 1/1979 | Ogawa et al. | 428/900 X |

*Primary Examiner*—Thomas J. Herbert, Jr.

*Attorney, Agent, or Firm*—Geoffrey H. Krauss; Joseph T. Cohen; Marvin Snyder

[57] ABSTRACT

A magnetic belt for magnetic printing and the like has a relatively low surface resistivity provided by a conductive surface layer to eliminate unacceptable toner background.

7 Claims, 2 Drawing Figures

MAGNETIC BELT WITH CONDUCTIVE COATING

BACKGROUND OF THE INVENTION

The present invention relates to magnetic belts for magnetic printers and the like and, more particularly, to a novel magnetic belt having a conductive coating.

Magnetic printing systems, such as is described in U.S. Pat. 3,946,404, issued Mar. 23, 1976 and assigned to the assignee of the present invention, are known which utilize a magnetic recording belt on which a latent magnetic image is formed by a magnetic recording head, for subsequent selective transfer of ink patterns to a permanent media. As described in the aforementioned patent, a magnetic recording tape is comprised of a plastic resin backing layer upon which is fabricated a ferromagnetic recording layer; the belt is caused to travel past a magnetic recording head array to magnetize the ferromagnetic material of the recording layer in a direction in accordance with the magnetic field established by the head responsive to externally derived electronic signals. Among the properties required of such a magnetic belt, on which latent magnetic images are formed by a magnetic recording head, are the following: the belt must be thin enough to have the necessary degree of flexibility; the oxide coating of the ferromagnetic recording layer must not only have adequate magnetic performance but must also be of a thickness to permit the recording field to properly orient magnetized recording areas therein and then permit the recorded image to attract ink (toner) for subsequent transfer to a permanent medium (e.g. paper); the electrical conductivity of the oxide coating must be high enough to prevent accumulation of electric charge which would attract toner to areas which should be blank, thereby causing undesirable "background" along with the desired recorded image; and the belt must have a relatively high abrasion resistance to resist wear as one side of the belt travels over a supporting surface of the magnetic recording head. Thus, a sufficiently high value of remanence $B_R$ must be achieved in conjunction with a relatively high conductivity, typically expressed as a surface resistivity of less than $10^9$ ohms per square. This combination of properties is not easily achieved in known magnetic tapes as the relatively high value of $B_R$ requires a high volume fraction of magnetic oxide, in the ferromagnetic recording layer, which indicates that less volume of the layer is available for any additives utilized to increase conductivity of the recording layer.

A magnetic recording belt having a ferromagnetic recording layer having a relatively high value of $B_R$, in excess of 1400 gauss, but having a surface resistivity less than $10^9$ ohms per square, is desirable for use in magnetic printing applications.

BRIEF DESCRIPTION OF THE INVENTION

In accordance with the invention, a magnetic recording belt for use in a magnetic printer comprises a plastic resin backing layer upon which is fabricateda ferromagnetic recording layer, formed of a material having the necessary magnetic characteristics; the ferromagnetic recording layer is overlayed with a thin, non-magnetic coating having a surface resistivity on the order of $10^6$ ohms per square and not otherwise affecting the performance of the magnetic belt, as the wavelengths involved in magnetic printing are on the order of 2–10 milli-inches, whereas audio and video recording utilizes wavelengths typically 10 to 100 times shorter.

In a preferred embodiment of the magnetic belt having a conductive coating, the belt is sprayed with a solution of DAG 154 diluted with isopropanol, whereby, upon evaporation of the isopropanol, a thin coating of resin-supported carbon particles is present upon an exterior belt surface. This conductive coating has the additional advantage of increasing the abrasion resistance of the oxide coating and, subsequently, belt life is increased.

Accordingly, it is an object of the present invention to provide a novel magnetic recording belt having a relatively high surface conductivity, for use in a magnetic printer.

This and other objects of the present invention will become apparent upon consideration of the following detailed description in conjunction with the drawings.

DETAILED DESCRIPTION OF THE INVENTION

Figure 1:
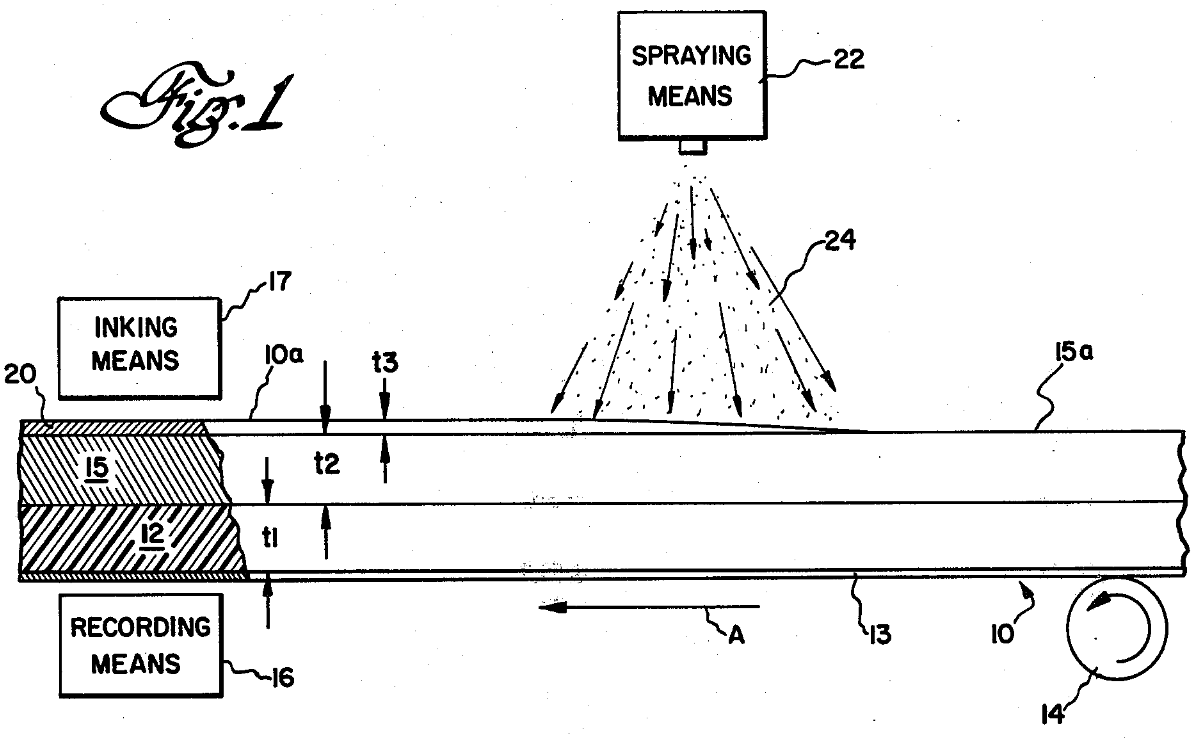
FIG. 1 is a sectional side view of the novel conductively coated magnetic belt, the means for fabricating the conductive coating thereon, and of the relationship between the belt and recording and inking means.

Referring now to FIG. 1, a preferred embodiment of our novel conductively coated magnetic recording belt 10 comprising a backing layer 12 fabricated of a plastic resin material, such as Mylar™ and the like, and having a thickness $t_1$, preferably on the order of 0.8 milli-inches. A conducting layer 13 may be utilized, in known fashion, upon a surface of backing layer 12, for preventing static charge buildup when the belt is driven by a drive means 14; typically layer 13 has a resistivity on the order of $10^5$ ohms-per-square and a thickness of about 0.05 milli-inches. A ferromagnetic recording layer 15, formed of a magnetic oxide and the like, is fabricated upon the remaining surface of supporting layer 12 to a thickness $t_2$, preferably from about 0.55 milli-inches to about 0.75 milli-inches. The ferromagnetic oxide material of recording layer 15 will advantageously have a remanence ($B_R$) of value greater than 1400 gauss and a coercive force ($H_c$) of approximately 300 Oersteds.

In a preferred magnetic printer configuration, magnetic recording means 16 is positioned adjacent the non-oxide-bearing surface of the backing layer 12, and selectively magnetizes regions of recording layer 15, through backing layer 12, in accordance with a desired indicia pattern to be printed. The selectively magnetized portions of layer 15 then attract and retain magnetic toner material, supplied by an inking means 17, upon the surface 15a of the oxide layer furthest from backing layer 12. A typical magnetic recording belt having the above-described backing layer 12 and magnetic recording layer 15, with or without the conductive coating 13 upon the backing layer surface closest to recording means 16, may have adequate thickness and remanent induction characteristics, but will generally have a surface resistivity, at oxide surface 15a closest to inking means 17, of greater than about $10^{10}$ ohms-per-square, resulting in the formation of unacceptable levels of background pick-up.

Thus, viewing the surface 15a of belt 10, after the belt has traveled in the direction of arrows A (FIG. 2) past recording means 16 and opposed inking means 17, as guided and driven by rollers 18, the inked characters, symbols and other indicia 19*a* appear against a "stippled" background 19*b* caused by extraneous magnetic toner pick-up by the magnetic oxide layer surface 15*a*. It is desired that the belt exterior surface 10*a*, bearing the toner deposits forming indicia 19*a* be relatively free of all background deposits, as at 19*b'* of FIG. 2.

In accordance with the invention, a layer 20 of a conductive coating, advantageously comprising carbon particles supported in a resin, is fabricated upon that surface 15*a* of the oxide layer 15 furthest from the supporting layer 12. Conductive coating layer 20 isfabricated to a thickness $t_3$, preferably on the order of 0.1 milli-inches; the resulting surface resistivity for such a conductive coating layer is found to be on the order of $10^6$ ohms per square and is sufficient to essentially eliminate the problem of background formation while having no adverse effect upon the magnetic performance of the printing belt.

Figure 2:
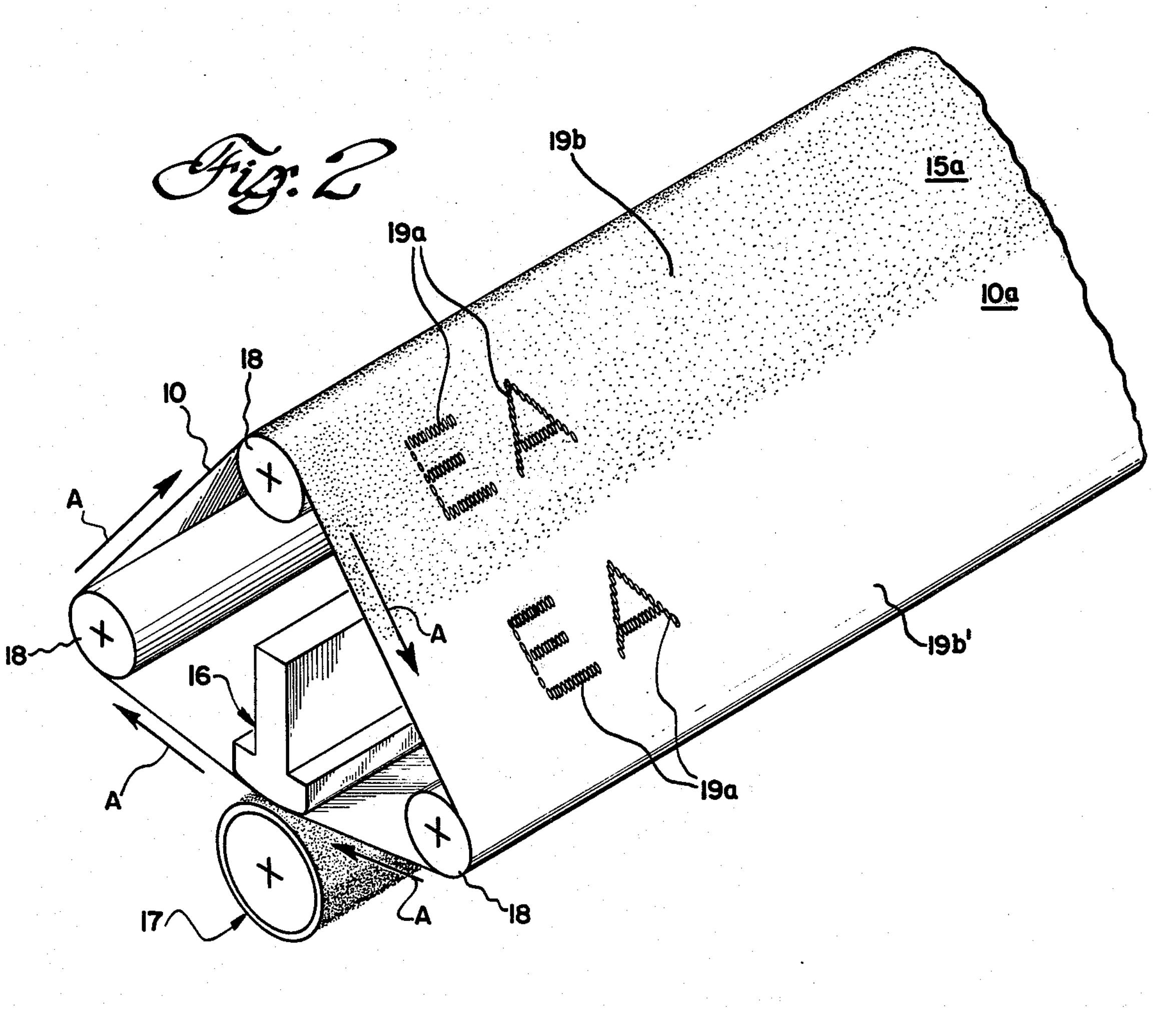
FIG. 2 is a perspective view of a portion of a magnetic printer using the belt.

The conductive coating layer is advantageously fabricated by utilizing spraying means 22 to direct a mist 24 of the coating material, diluted with a volatile carrier, upon ferromagnetic coating layer surface 15*a* as the belt moves in the direction of arrow A with respect to the spraying means, prior to forming an endless loop of the belt material for installation in the mechanism of FIG. 2 (i.e. means 16 and 17 appear in FIG. 1 for purposes of explanation only and are not present during fabrication of conductive coating layer 20). Upon evaporation of the volatile carrier, the desired conductive coating layer 20 remains. We have found that a particularly useful material, containing carbon particles and the supporting resin, is DAG 154, manufactured by the Acheson Co., and a volatile carrier for diluting this material is isopropanol. It should be understood, however, that other means such as brushing on of a slurry, for fabricating conductive coating layer 20 may be utilized, as may suitable means for controlling the thickness $t_3$ of the conductive coating 20, dependent upon the desired thickness to be achieved. Similarly, it should be understood that other conductivity materials may be utilized to achieve somewhat lesser or greater values of surface resistivity.

We have also found that the addition of the conductive coating provides additional abrasion resistance for the underlying oxide layer 15, to decrease belt wear and increase belt life when the completed belt is installed and utilized in the printing apparatus.

By way of illustrative example, a magnetic printing belt 10 fabricated using a length of Grand Master audio recording tape (as available from AMPEX) has resistivity of greater than $10^{11}$ ohms-per-square and results in a background accumulation causing a gray colored background tinge to appear (as at area 19*b*) when the toner is transferred and fixed to a paper medium; the resulting print is judged difficult to read. We have coated the same tape with approximately 50 micro-inches of DAG 154 to achieve a surface resistivity of about $10^6$ ohms-per-square and virtually eliminate all background (as at area 19*b'*), under the same printing conditions as utilized for testing the uncoated tape. We have found that there was no measureable decrease in magnetic printing signal due to the interposed conductive coating 20 and that low background accumulation of magnetic toner coincides with surface resistivities of less than approximately $10^9$ ohmsper-square.

While the present invention has been described with respect to one preferred embodiment thereof, many variations and modifications will now become apparent to those skilled in the art. It is our intent, therefore, to not be limited by the specific embodiments disclosed herein, but only by the scope of the appending claims.

What is claimed is:

1. A magnetic belt for use in a magnetic printer having means for magnetically recording information on said belt, comprising:

a backing layer having opposed first and second surfaces, said first surface being positioned adjacent to said magnetic recording means when said belt is in use;

a recording layer having first and second opposed surfaces and fabricated of ferromagnetic material, the first surface of said recording layer being in abutment with said second surface of said backing layer; and a layer of conductive material, including carbon particles supported in a resin, fabricated upon said second surface of said recording layer furthest from said backing layer and providing said second surface of said recording layer with a surface resistivity of less than $10^9$ ohms-per-square.

2. A magnetic belt as set forth in claim 1, wherein said surface resistivity is on the order of $10^6$ ohms-persquare.

3. A magnetic belt as set forth in claim 1, wherein said backing layer is formed of a plastic resin material; and said recording layer is formed of a ferromagnetic oxide material.

4. A magnetic belt as set forth in claim 1, wherein said recording layer has a value of remanence in excess of 1400 gauss.

5. A magnetic belt as set forth in claim 1, wherein said conductive coating layer has a thickness on the order of 0.1 milli-inches.

6. A magnetic belt as set forth in claim 5, wherein said recording layer has a thickness from about 0.55 milli-inches to about 0.75 milli-inches.

7. A magnetic belt as set forth in claim 1, wherein said backing layer has a thickness of about 0.8 milli-inches.

* * * * *